Patented July 21, 1942

2,290,274

UNITED STATES PATENT OFFICE 2,290,274

BARBITURIC ACID COMPOUND AND PROCESS OF MAKING SAME

William G. Bywater, Detroit, Mich., and Stephen B. Binkley, St. Louis, Mo., assignors to Parke, Davis & Company, Detroit, Mich., a corporation of Michigan No Drawing. Application April 24, 1939, Serial No. 269,810

12 Claims. (Cl. 260—257)

The invention relates to new barbiturates and thiobarbiturates, that is, barbituric and thiobarbituric acids and their salts, and more particularly to barbiturates and thiobarbiturates having two hydrocarbon radicals attached to the 5-carbon atom of the barbituric or thiobarbituric acid ring, at least one of which hydrocarbon radicals is a 2-methyl-2-pentenyl radical.

The general formula for the compounds of the invention may be written as follows,

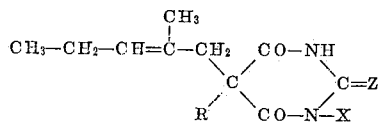

where R is a hydrocarbon radical containing not more than six carbon atoms, Z is O or S, and X represents a member of the class consisting of hydrogen, an alkali metal, an equivalent of an alkaline earth metal, ammonium, alkylammonium and dialkylammonium.

R includes numerous hydrocarbon radicals, for example primary or secondary alkyl; cycloalkyl, such as cyclohexyl; cycloalkenyl, such as cyclopentenyl or cyclohexenyl; aryl, such as phenyl, etc.

The main object of the invention is to produce barbituric and thiobarbituric acid compounds of the formula given above, but another object is to produce certain new intermediate compounds, such as the corresponding di-substituted malonic esters, and the 1-halogeno-2-methyl-2-pentenes.

In carrying out the invention, one may use any of the known methods for forming barbituric and thiobarbituric acid compounds. One method is to start with 1-chloro-2-methyl-2-pentene having the formula

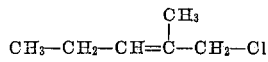

and react the same with an alkali compound of a malonic ester of formula,

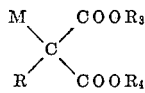

where R has the significance already given above, R3 and R4 are alkyl radicals, and M represents an alkali metal such as sodium.

This forms a di-substituted malonic ester of formula,

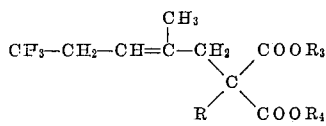

which can then be reacted in known manner with urea or thiourea to form the new barbituric or thiobarbituric acids of the invention. The acids are readily converted by reaction with basic or alkaline salt-forming compounds into their corresponding barbituric or thiobarbituric acid salts, included in the general formula given above.

Other alternative methods may also be used as is well understood in the art, but in each case it is necessary to use in some step of the process 1-chloro-2-methyl-2-pentene or equivalent halogeno compound. This material may be advantageously prepared from ethyl isopropenyl carbinol (2-methyl-1-pentene-3-ol) by the methods hereinafter referred to.

The compounds of the invention are useful not only because they constitute a new group of chemical substances having special properties by virtue of the kind of hydrocarbon groups substituted at the methylene carbon atom of the barbituric acid ring, but are also valuable pharmaceutically, especially as soporifics and hypnotics.

It has been found that barbiturates having an ethylenic hydrocarbon radical attached to the barbituric acid methylene carbon atom are prone to produce a convulsant action when administered to the animal organism. On the other hand, the compounds of the present invention are remarkably free from such convulsant action and this is believed to be due to the presence of the 2-methyl-2-pentenyl group.

Although the invention includes preparation of a large class of chemical compounds, we have found that the preferred compounds from the standpoint of hypnotic properties, which are low in toxicity and lacking in other undesirable physiological properties, but high in effectiveness as hypnotics and soporifics, are those in which R of the general formula is a member of the group ethyl and allyl.

The invention may be illustrated by the following examples.

EXAMPLE 1.—*Preparation of isopropenylethylcarbinol*

Ethyl magnesium bromide is first prepared in the usual manner (Organic Syntheses XI, 98, John Wiley & Sons, Inc., 1931). 52.8 grams (2.2 moles) of magnesium turnings are covered with 500 cc. of anhydrous ether. To the flask is then added 20 cc. of ethyl bromide and a crystal of iodine. After the reaction has started, the remainder of the ethyl bromide (total of 238 grams or 2.2 moles) in 300 cc. of anhydrous ether is added to the reaction vessel while the reaction mixture is stirred vigorously and the vessel cooled in an ice-bath. When all the ethyl bromide has been added the reaction mixture is heated for one-half hour at room temperature. The ether solution at this point is dark colored and has in it a slight grey precipitate. To it is added dropwise, while stirring and cooling in an ice-bath, 140 grams (2 moles) of methylacrolein in 200 cc. of ether. The reaction mixture is stirred for one-half hour after the methylacrolein has been added. All of the Grignard reagent is used up as shown by the Gilman color test (Gilman and Schultz, J. Am. Chem. Soc. 47, 2002 (1925)). The reaction mixture is allowed to stand for 15 to 18 hours, then the product is hydrolyzed by first adding cold water until the first vigorous reaction has subsided, then neutralizing the mixture with 2.2 equivalents of hydrochloric acid diluted with ice. The grey solid in the flask slowly dissolves. The ether layer is separated in a large separatory funnel, and the aqueous phase extracted with 250 cc. of ether. The extract is added to the original ether solution and dried over powdered lime, filtered and fractionated. The fraction boiling at 129–134° at 753 mm. is collected. The index of refraction is $n^{20}_D = 1.4336$ and the yield is 58.2 per cent based on the methylacrolein used.

The reactions used in the above example may be represented as follows:

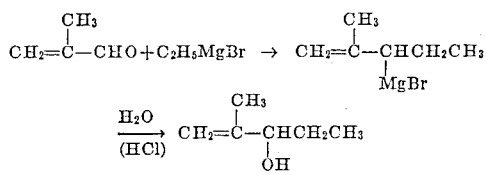

Example 2.—*Preparation of 1-chloro-2-methyl-2-pentene*

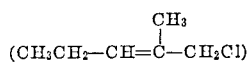

The starting material for this halide is ethylisopropenyl carbinol (2-methyl-1-pentene-3-ol) of Example 1.

Several methods may be used to obtain 1-chloro-2-methyl-2-pentene from this alcohol such as by the action of thionyl chloride upon a benzene, chloroform, ether, or carbon tetrachloride solution of the alcohol; by the action of thionyl chloride on the alcohol with no diluent, and by the action of phosphorus trichloride and gaseous hydrogen chloride upon a pyridine-anhydrous ether solution of the alcohol at low temperature. These methods give a mixture of 3-chloro-2-methyl-1-pentene, 1-chloro-2-methyl-2-pentene, a small quantity of other isomeric chlorides and considerable amount of tar. Approximately equal amounts of 3-chloro-2-methyl-1-pentene and 1-chloro-2-methyl-2-pentene are found in the reaction product. It is preferable in order to increase the proportionate amount of the primary chloride, to carry out the conversion essentially as outlined in the following examples:

A. To 238 grams of thionyl chloride diluted with 200 ml. of dry benzene, is added during one hour, 200 grams (2 moles) of ethylisopropenyl carbinol. The reaction is carried out in a vessel equipped with a mechanical stirrer, dropping funnel and outlet tube for the gaseous products. Vigorous stirring hastens release of the gases and diminishes the amount of coloration usually observed in such reactions. When all the alcohol has been introduced into the solution, it is heated on the steam bath for 1.5 to 2 hours, then chilled and slowly poured into ice water. The benzene solution is washed with 5 percent sodium carbonate and dried with anhydrous calcium chloride. Benzene is removed by distillation through a Widmer column at 150 mm. pressure. The isomeric chlorides are separated at 90 mm. pressure. After removing a small quantity of 3-chloro-2-methyl-1-pentene, an intermediate fraction boiling at 63–66° C. ($n^{20}_D$ 1.4456–65) is obtained then at 66–69° C., 125 grams (or a 53 percent yield) of 1-chloro-2-methyl-2-pentene distills from the flask; ($n^{20}_D$ 1.4482).

B. One hundred forty-six grams of ethyl-isopropenyl carbinol diluted with an equal volume of anhydrous ether is placed in a suitable vessel equipped with a mechanical stirrer, reflux condenser and a dropping funnel. While the solution is stirred vigorously, 180 grams (one equivalent plus ten percent excess) of technical thionyl chloride is added dropwise at room temperature. When the addition is completed, the solution is refluxed for 2 hours. The product is isolated as outlined under A except that the bulk of the ether is removed at atmospheric pressure. Total yield of chlorides by this method is 76 percent and the yield of 1-chloro-2-methyl-2-pentene distilling at 65–69° at 90 mm. ($n^{20}_D$ 1.4482) is 54 percent.

Example 3.—*Preparation of ethyl (2-methyl-2-pentenyl-) malonate*

Sodium ethylate is prepared from 25.3 grams (1.1 moles) of freshly cut strips of sodium and 350 cc. of absolute alcohol in a one liter three-necked flask equipped with a mechanical stirrer, reflux condenser and dropping funnel. After adding 193 grams (1.2 moles) of ethyl malonate to the solution, 170 cc. of alcohol are distilled out. To the semi-solid residue at 55° is added dropwise, 131 grams 1.1 moles of 1-chloro-2-methyl-2-pentene as stirring is continued. The reaction is exothermic and as the addition progresses, the original solid dissolves, the material becomes more fluid and sodium chloride begins to separate. The mixture is now refluxed for one or two hours to complete the reaction. After cooling, sufficient cold water is added to dissolve the salt. The resulting oil is separated and dried with anhydrous calcium chloride. Ethyl (2-methyl-2-pentenyl-) malonate boils at 117–121° C. at about 2 mm. pressure and has a refractive index of 1.4417–1.4420 at 20° C. The yield of ester secured by this method is 70 percent.

Example 4.—*Preparation of ethyl di-(2-methyl-2-pentenyl-) malonate*

This ester is formed in small amounts when the same proportion of reactants are used as described in Example 3 for the synthesis of ethyl (2-methyl-2-pentenyl-) malonate and the same procedure is followed except that no alcohol is distilled from the reaction mixture until the products are ready to be isolated. Ethyl di-(2-methyl-2-pentenyl-) malonate distills at 165–175° C. at 3 mm. pressure; $n^{20}_D$ 1.4593.

Example 5.—*Preparation of ethyl (ethyl-) (2-methyl-2-pentenyl-) malonate*

To 40 grams (0.21 mole) of ethyl ethylmalonate dissolved in sodium ethylate (from 4.9 grams of sodium and 74 ml. of absolute ethanol) cooled to 30–40° C., is added 25 grams (0.21 mole) of 1-chloro-2-methyl-2-pentene in small portions. Sodium chloride begins to separate almost immediately. After the addition is complete the mixture is allowed to stand for 30 minutes and then is refluxed for one hour. Thirty cc. of alcohol are removed by distillation and refluxing is continued for 2.5 hours. After cooling, 100 cc. of cold water is added and the oil is separated and dried with anhydrous calcium chloride. The ester is then distilled under reduced pressure; boiling point: 117° C. at 2 mm.; $n^{20}_D$ 1.4472. The yield is 63 percent.

EXAMPLE 6.—*Preparation of ethyl(isopropyl-) (2-methyl-2-pentenyl-) malonate*

A. A solution of sodium ethylate is prepared from 270 cc. of anhydrous ethanol and 17.9 grams of sodium. It is cooled to 45° C. and diluted with 186.9 grams (0.77 mole) of ethyl (2-methyl-2-pentenyl-) malonate (Example 3). Approximately 75 cc. of alcohol are distilled from the solution and 113.9 grams (0.92 mole) of isopropyl bromide is slowly dropped into the reaction vessel while stirring the solution. The reactants are allowed to stand at room temperature at least 0.5 hour, then are refluxed for 1.5 to 2 hours. In order to facilitate isolation of the desired ester, it is preferable to distill about 80 cc. of solvent from the reaction mixture before dissolving the precipitated sodium chloride in water. The oil which separates is dried with anhydrous calcium chloride and fractionated under reduced pressure: boiling point 124–130° C. (127.5–129.5° C.) at about 2 mm.; $n^{20}_D$ 1.4500; yield: 170 grams or 77.7 percent of the theoretical.

B. The di-substituted ester can also be synthesized by the action of 1-chloro-2-methyl-2-pentene on ethyl isopropylmalonate in sodium ethylate but the yield is much lower than is secured in example A. It is, however, less difficult to separate unreacted ethyl isopropylmalonate. The ester secured by these reactions has the same properties as obtained in part A.

EXAMPLE 7.—*Preparation of ethyl(n-propyl-) (2-methyl-2-pentenyl-) malonate*

This ester is prepared by the condensation of n-propyl bromide and ethyl (2-methyl-2-pentenyl-) malonate (Example 3) in the presence of sodium ethylate without refluxing the solution. It boils at 125–130° at about 2 mm. pressure; $n^{20}_D$ 1.4477. Yield: 52 percent.

EXAMPLE 8.—*Preparation of ethyl (allyl-) (2-methyl-2-pentenyl-) malonate*

Sodium ethylate is prepared as usual from 6.9 grams of sodium and 105 cc. of absolute ethanol. To this solution is added 57 grams (0.285 moles) of ethyl allylmalonate, followed by 36 grams (0.03 mole) of 1-chloro-2-methyl-2-pentene. When all the halide has been introduced, the solution is refluxed for one hour, then 40 cc. of alcohol is distilled out and refluxing is continued for 4 hours. The ester is worked up as usual. The yield of ethyl (allyl-) (2-methyl-2-pentenyl-) malonate boiling at 122.5–124° C. at about 2.5 mm. ($n^{20}_D$ 1.4555), is 51.6 grams or 67 percent.

EXAMPLE 9.—*Preparation of ethyl (n-butyl-) (2-methyl-2-pentenyl-) malonate*

Utilizing the same procedure as given for the preparation of ethyl (isopropyl-) (2-methyl-2-pentenyl-) malonate (Example 6), ethyl n-butylmalonate is condensed with 1-chloro-2-methyl-2-pentene in the presence of sodium ethylate to give ethyl (n-butyl-) (2-methyl- 2 -pentenyl -) malonate in 87 percent yield. The ester distills at 129–132.5° C. under 2 mm. pressure and has a refractive index, $n^{20}_D$, of 1.4483.

EXAMPLE 10.—*Preparation of ethyl (2-methyl allyl-) (2-methyl-2-pentenyl-) malonate*

Sodium ethylate, prepared from 4.6 grams of sodium and 70 cc. of anhydrous ethanol, is concentrated by distilling from the flask about one-third of the alcohol after 42.8 grams (0.2 mole) of ethyl 2-methylallyl-malonate has been added. The solution is now cooled to 45° C. and 28.5 grams (0.24 mole) of 1-chloro-2-methyl-2-pentene is slowly introduced. When the addition is complete, the mixture is refluxed for 4.5 to 6 hours. The sodium chloride is taken up in 200 cc. of water, the oil is separated and dried with anhydrous calcium chloride. Upon fractionation 43.5 grams or 73 percent of the theoretical yield of ethyl (2-methylallyl-) (2-methyl-2-pentenyl-) malonate is secured which distills at 129–133.5° at 2 mm. pressure, $n^{20}_D$ 1.4590.

EXAMPLE 11.—*Preparation of 5 - ethyl - 5 - (2-methyl-2-pentenyl-) barbituric acid*

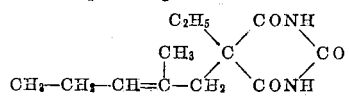

To the sodium ethylate solution prepared from 7.7 grams of sodium and 115 cc. of absolute ethanol, is added 30 grams (0.12 mole) of ethyl (ethyl-) (2-methyl-2-pentenyl-) malonate (Example 5) and 8.4 grams (0.14 mole) of urea. After refluxing the solution for 45 minutes, 55 cc. of ethanol is slowly distilled out. Refluxing is continued for 3.5 hours or until a test portion diluted with water shows no oily drops. The thick, viscous product is dissolved in 200 ml. of water and clarified with charcoal. The barbituric acid is precipitated with dilute mineral acid, then purified by reprecipitation from a dilute alkaline solution with carbon dioxide. It may also be purified by recrystallization from dilute alcohol or from ethylene dichloride. Pure 5-ethyl-5-(2-methyl-2-pentenyl-) barbituric acid is secured as a white crystalline solid which melts at 152–153° C.

EXAMPLE 12.—*Preparation of 5-(n-propyl-)-5-(2-methyl-2-pentenyl-) barbituric acid*

This acid is synthesized in the manner outlined in Example 11, from ethyl (n-propyl-) (2-methyl-2-pentenyl-) malonate (Example 7) and urea in the presence of sodium ethylate. It occurs as a white crystalline solid which melts at 142–243° C. Analysis: nitrogen, found 11.25; calc. 11.11 percent.

EXAMPLE 13.—*Preparation of 5-isopropyl-5-(2-methyl-2-pentenyl-) barbituric acid*

Sodium ethylate is prepared from 64.4 grams (2.8 moles) of sodium and 960 cc. of absolute ethanol to which is added 265 grams (0.93 mole) of ethyl (isopropyl-) (2 - methyl - 2 - pentenyl -) malonate (Example 6) and 83.4 grams (1.4 moles) of urea. About one-half of the alcohol is distilled from the solution, then refluxing is continued for 1.5 hours or until a test portion of the reaction mixture when diluted with three volumes of water shows no unreacted ester. The reaction mixture is cooled and diluted with 1500 cc. of water. Pure 5-isopropyl-5-(2 -methyl - 2 - pentenyl-) barbituric acid, after precipitation with dilute mineral acid and recrystallization from hot diluted alcohol, is secured as white crystals melting at 113–114° C. Analysis: nitrogen, found 11.41; calc. 11.11 percent.

EXAMPLE 14.—*Preparation of sodium 5-isopropyl-5-(2-methyl-2-pentenyl-) barbiturate*

Sixty-two and one-half grams of 5-isopropyl-5-(2-methyl-2-pentenyl) barbituric acid (Example 13) are dissolved in 250 cc. of 1.0085 normal sodium hydroxide solution. The solution is filtered until clear, then is dried in vacuo, preferably at 50° C. The salt is obtained as a white amorphous solid, completely soluble in water. A 5 percent aqueous solution has a pH between 10.4 and 10.6 as determined with the glass electrode.

EXAMPLE 15.—*Preparation of 5-allyl-5-(2-methyl-2-pentenyl-) barbituric acid*

Condensation of urea and ethyl (allyl-) (2-methyl-2-pentenyl-) malonate (Example 8) in the presence of sodium ethylate as described in Example 11 gives the white crystalline barbituric acid melting at 118–118.5 in 50 percent yield. Analysis: nitrogen found, 11.32; calc. 11.20 percent.

EXAMPLE 16.—*Preparation of 5-n-butyl-5-(2-methyl-2-pentenyl-) barbituric acid*

To a solution of sodium ethylate prepared from 6 grams (0.26 mole) of sodium and 90 cc. of absolute ethanol, is added 23.5 grams (0.078 mole) of ethyl (n-butyl-) (2-methyl-2-pentenyl-) malonate (Example 9) and 7.8 grams (0.13 mole) of powdered urea. The solution is refluxed for 3.5 hours and then 44 cc. of alcohol is slowly distilled from the flask. Refluxing is continued until the ester has been completely condensed. The crude barbituric acid is precipitated with diluted hydrochloric acid after the reaction product is taken up in water, then recrystallized from dilute ethanol or from benzene. It is secured as a white crystalline solid melting at 146.5–148°. Analysis: nitrogen, found 10.54; calc. 10.52 percent.

EXAMPLE 17.—*Preparation of 5-(2-methylallyl-)-5-(2-methyl-2-pentenyl-) barbituric acid*

Condensation of 21.5 grams (0.07 mole) of ethyl (2-methylallyl-) (2-methyl-2-pentenyl-) malonate (Example 10) with 6.6 grams (0.11 mole) of urea in the presence of sodium ethylate prepared from 5 grams of sodium and 75 cc. of anhydrous ethanol, gives 5-(2-methylallyl-)-5-(2-methyl-2-pentenyl-) barbituric acid which after recrystallization from benzene and then from a large volume of hot water, melts at 144.5–146°. Analysis: nitrogen, found 10.52, 10.38; calc. 10.53 percent.

The thiobarbituric acid corresponding to the barbituric acid of this example can also be obtained by a similar condensation of the ethyl (2-methylallyl-) (2-methyl-2-pentenyl-) malonate by condensing it with thiourea instead of urea. The melting point of the 5-(2-methylallyl)-5-(2-methyl-2-pentenyl-) thiobarbituric acid is 117° C.

EXAMPLE 18.—*Preparation of 5-isopropyl-5-(2 methyl-2-pentenyl) -2-thiobarbituric acid*

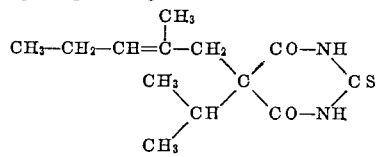

To a solution of sodium ethylate prepared from 7.6 grams (0.33 mole) of sodium and 115 cc. of absolute ethanol, is added 30 grams (0.11 mole) of ethyl (isopropyl-) (2-methyl-2-pentenyl-) malonate (Example 6) and 12.5 grams of thiourea. The solution is refluxed for about one hour, then 70 cc. of alcohol are removed by distillation. Four grams of thiourea are added and the solution is refluxed for one hour longer, then diluted with 120 cc. of cold water. Some unreacted ester is removed by separation and the aqueous phase is clarified with charcoal. The crude product is precipitated from the alkaline solution with dilute mineral acid, then purified by recrystallization from dilute ethanol or from ethylene dichloride to give 5-isopropyl-5-(2-methyl-2-pentenyl)-2-thiobarbituric acid melting at 137–139° C. Analysis: nitrogen, found 10.24; calc. 10.40 percent.

As a variation in the procedure, two equivalents of thiourea may be refluxed with one equivalent of ethyl (isopropyl-) (2-methyl-2-pentenyl-) malonate (Example 6) in an anhydrous alcoholic solution of sodium alcoholate for several hours without removing the solvent until the end of the reaction period.

EXAMPLE 19.—*Preparation of salts of barbituric and thiobarbituric acids*

A solution containing a mole of alkali metal hydroxide or alcoholate, such as sodium hydroxide or sodium ethylate, is added to one mole of the barbituric or thiobarbituric acids of Examples 12, 13, 15, 16, 17 or 18 in a solvent, such as water or alcohol, to give a solution of the alkali salt of the acid. The solution is filtered, if necessary, and then evaporated, preferably at a low temperature and under diminished pressure, until the salt is obtained in solid form.

The alkali metal salts, such as the sodium salt, are white solids soluble in water and alcohol and insoluble in water immiscible solvents. The solutions of the sodium salts when treated with acids regenerate the corresponding barbituric or thiobarbituric acids. They produce an excellent hypnotic effect when administered to the animal organism. They may be prepared in the form of clear aqueous solutions for injection purposes.

Instead of reacting the barbituric or thiobarbituric acids in this example with an alkaline solution of an alkali metal compound, an aqueous or other suitable solution of ammonium hydroxide or a monoalkylamine or dialkylamine or a basic solution of an alkaline earth metal compound, such as calcium hydroxide or barium hydroxide may be reacted to give the corresponding monoalkyl ammonium, dialkyl ammonium and alkaline earth metal salts.

Although the above examples illustrate the invention, it is not limited to the specific compounds or conditions or reactions described therein, since other compounds embodied in the formulas given may be utilized and prepared, and other reactions or methods of preparation can be made use of. For example, the cyanoacetic acid process may be used.

What we claim as our invention is:

1. A barbiturate represented by the formula,

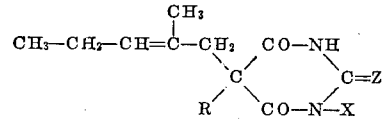

where R is a hydrocarbon radical containing not more than six carbon atoms, Z is a member of the class consisting of O and S, and X represents a member of the class consisting of hydrogen, an alkali metal, an equivalent of an alkaline earth metal, ammonium, alkylammonium and dialkylammonium.

2. A barbiturate represented by the formula,

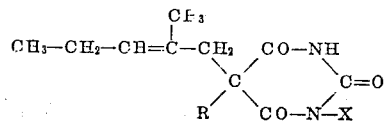

where R is a hydrocarbon radical containing not more than six carbon atoms, and X represents a member of the class consisting of hydrogen, an alkali metal, an equivalent of an alkaline earth metal, ammonium, alkylammonium and dialkylammonium.

3. A thiobarbiturate represented by the formula,

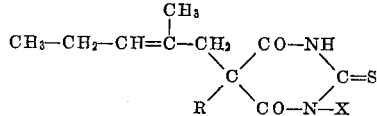

where R is a hydrocarbon radical containing not more than six carbon atoms, and X represents a member of the class consisting of hydrogen, an alkali metal, an equivalent of an alkaline earth metal, ammonium, alkylammonium and dialkylammonium.

4. A 5-isopropyl-5-(2-methyl-2-pentenyl) thiobarbiturate.

5. Sodium 5-isopropyl-5-(2-methyl-2-pentenyl) thiobarbiturate.

6. A 5-isopropyl-5-(2-methyl-2-pentenyl) barbiturate.

7. Sodium 5-isopropyl-5-(2-methyl-2-pentenyl) barbiturate.

8. 5-n-butyl-5-(2-methyl-2-pentenyl) barbituric acid.

9. A barbiturate represented by the formula,

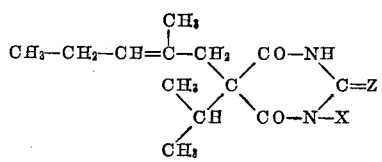

where Z is a member of the class consisting of O and S, and X represents a member of the class consisting of hydrogen, an alkali metal, an equivalent of an alkaline earth metal, ammonium, alkylammonium and dialkylammonium.

10. A barbiturate represented by the formula,

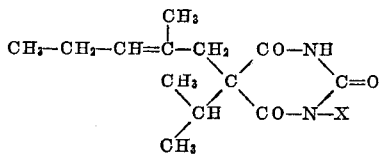

where X represents a member of the class consisting of hydrogen, an alkali metal, an equivalent of an alkaline earth metal, ammonium, alkylammonium and dialkylammonium.

11. A thiobarbiturate represented by the formula,

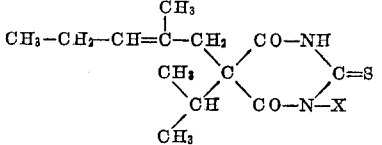

where X represents a member of the class consisting of hydrogen, an alkali metal, an equivalent of an alkaline earth metal, ammonium, alkylammonium and dialkylammonium.

12. A barbiturate represented by the formula,

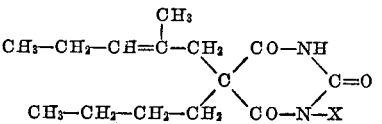

where X represents a member of the class consisting of hydrogen, an alkali metal, an equivalent of an alkaline earth metal, ammonium, alkylammonium and dialkylammonium.

WILLIAM G. BYWATER.
STEPHEN B. BINKLEY.